US012541312B1

United States Patent
Callahan et al.

(10) Patent No.: US 12,541,312 B1
(45) Date of Patent: Feb. 3, 2026

(54) STORAGE OPERATIONS BASED ON ENHANCED CONTIGUITY AWARENESS

(71) Applicant: NetApp, Inc., San Jose, CA (US)

(72) Inventors: Travis Ian Callahan, Apex, NC (US); Jian Hu, Apex, NC (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/927,221

(22) Filed: Oct. 25, 2024

(51) Int. Cl.
*G06F 3/06* (2006.01)

(52) U.S. Cl.
CPC .......... *G06F 3/0631* (2013.01); *G06F 3/0604* (2013.01); *G06F 3/0659* (2013.01); *G06F 3/0683* (2013.01)

(58) Field of Classification Search
CPC ....................................................... G06F 3/06
See application file for complete search history.

(56) References Cited

U.S. PATENT DOCUMENTS

| | | | |
|---|---|---|---|
| 6,636,879 B1 | 10/2003 | Doucette et al. | |
| 7,409,522 B1 | 8/2008 | Fair et al. | |
| 7,430,571 B2 | 9/2008 | Edwards | |
| 8,898,419 B2 | 11/2014 | Kesavan et al. | |
| 10,430,081 B2 | 10/2019 | Dronamraju et al. | |
| 11,409,448 B2 | 8/2022 | Dronamraju et al. | |
| 11,592,986 B2 | 2/2023 | Dronamraju et al. | |
| 11,803,329 B2 | 10/2023 | Doucette et al. | |
| 11,809,736 B2 * | 11/2023 | Zilberstein | G06F 3/0616 |
| 2013/0166838 A1 | 6/2013 | Kesavan et al. | |
| 2013/0173842 A1 * | 7/2013 | Ng | G06F 12/0246 711/E12.008 |
| 2013/0282955 A1 * | 10/2013 | Parker | G06F 12/0246 711/E12.008 |
| 2014/0173178 A1 | 6/2014 | Schwartz | |
| 2014/0289449 A1 | 9/2014 | Ogata | |
| 2020/0356288 A1 | 11/2020 | Dronamraju et al. | |

OTHER PUBLICATIONS

Curtis-Maury, Matthew et al., "Scalable Write Allocation in the WAFL File System," 46th International Conference on Parallel Processing, 10 pages, Aug. 14-17, 2017.

* cited by examiner

*Primary Examiner* — Khoa D Doan

(57) ABSTRACT

Improved write allocation in data storage systems is described. A data storage system controller determines a contiguity score for an allocation area on drives of the data storage system. The contiguity score for the allocation area is determined based on an evaluation of the contiguity of physical storage blocks mapped to the allocation area. A contiguity score is then determined for a secondary allocation area within the allocation area. The contiguity score for the secondary allocation area is determined based on an evaluation of the contiguity of physical storage blocks mapped to the smaller allocation area. The physical storage blocks mapped to the secondary allocation area are a subset of the physical storage blocks mapped to the primary allocation area. Where the contiguity score for the secondary allocation area meets or exceeds the contiguity score of the primary allocation area, the secondary allocation area is selected for use.

20 Claims, 10 Drawing Sheets

STORAGE OPERATIONS BASED ON ENHANCED CONTIGUITY AWARENESS

TECHNICAL FIELD

Aspects of the disclosure are generally related to the field of data storage technology, and in particular, to data storage allocation techniques.

BACKGROUND

Data storage systems are critically important in a wide variety of applications. Data storage systems commonly have a host, one or more controllers, and an aggregate of one or more storage discs (e.g., solid state drives). To manage the potentially immense pool of storage across one or more storage discs, allocation areas are used. Allocation areas allow data storage systems to subdivide and manage regions of aggregated storage and to allocate those regions to particular workloads, applications, and the like.

In operating data storage systems, it is preferrable to write data to contiguous blocks of storage within an allocation area. Writing data to contiguous blocks of storage within an allocation area improves both the efficiency of writing the data and the efficiency of reading the contiguously written data. To realize this benefit, allocation areas are evaluated for their contiguity. The contiguity of an allocation area is determined based on the contiguity of the underlying physical storage corresponding to that allocation area.

To maximize the amount of data written to contiguous blocks of physical storage, each allocation area of the storage aggregate is evaluated for contiguity and the allocation area with the greatest contiguity is used to write the data. This practice allows for the best use of the allocation areas of the storage aggregate.

Within the selected allocation area, however, no further contiguity information is available. As a result, data may still be written to storage within the selected allocation area that is not physically contiguous.

SUMMARY

Described herein are methods, apparatus, and systems for improved data storage allocation in data storage systems. A controller in the data storage system determines a contiguity score for a large allocation area (hereinafter referred to as the primary allocation area) on one or more drives of the data storage system. The primary allocation area contains within it a number of small allocation areas (hereinafter referred to as secondary allocation areas). The contiguity score for the primary allocation area is determined based on an evaluation of the contiguity of physical storage blocks mapped to the primary allocation area. A contiguity score is then determined for a secondary allocation area within the primary allocation area. The contiguity score for the secondary allocation area is determined based on an evaluation of the contiguity of physical storage blocks mapped to the secondary allocation area. The physical storage blocks mapped to the secondary allocation area are a subset of the physical storage blocks mapped to the primary allocation area.

The contiguity score for the primary allocation area and the secondary allocation area are compared to each other. Where the contiguity score for the secondary allocation area meets or exceeds the contiguity score for the primary allocation area, the secondary allocation area is used with respect to write requests to store data. Where the contiguity score of the secondary allocation area does not meet or exceed the contiguity score for the primary allocation area, the secondary allocation area is skipped.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Figure 1:
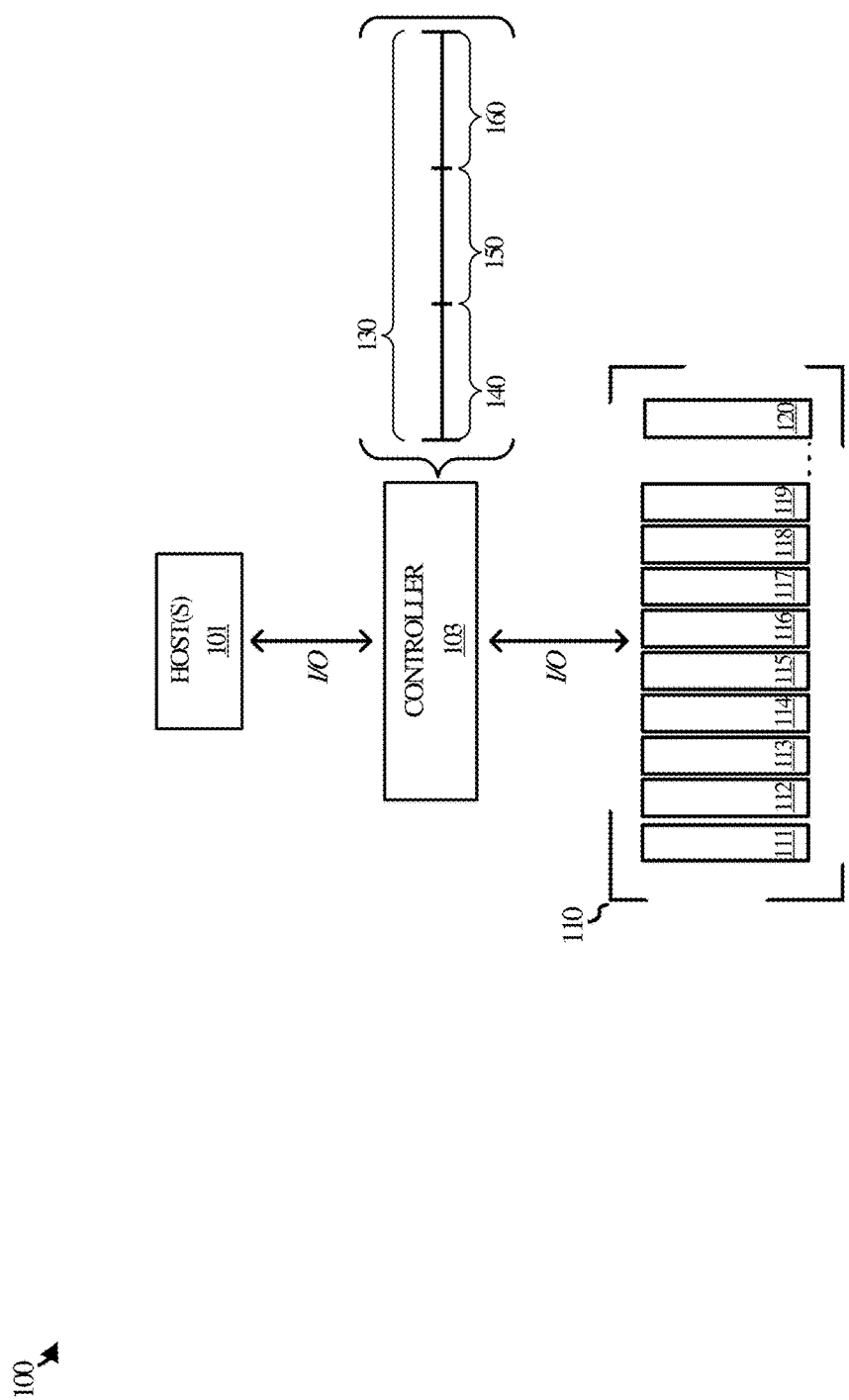
FIG. 1 illustrates a data storage system in accordance with an implementation.

Described herein are methods, apparatus, and systems for improved data storage allocation in data storage systems. A controller in the data storage system determines a contiguity score for a large allocation area (hereinafter referred to as the primary allocation area) on one or more drives of the data storage system. The primary allocation area contains within it a number of small allocation areas (hereinafter referred to as secondary allocation areas). The contiguity score for the primary allocation area is determined based on an evaluation of the contiguity of underlying physical storage mapped to the primary allocation area.

The one or more drives of the data storage system are divided into primary allocation areas, each of which are divided into secondary allocation areas. The scheme for subdividing primary allocation areas may take a number of forms. For example, each allocation area may be subdivided into a predetermined number of equivalently sized portions.

The controller then determines a contiguity score for a secondary allocation area from within the primary allocation area having already received a contiguity score. The contiguity score for the secondary allocation area is determined based on an evaluation of the underlying physical storage mapped to the secondary allocation area. Because the physical storage mapped to the secondary allocation area is a subset of the physical storage mapped to the primary allocation area, the contiguity of the physical storage underlying both the primary allocation area and its subdivisions need only be evaluated once in order to calculate the respective contiguities for the primary allocation area and each secondary allocation area within it.

The controller then determines if the secondary allocation area within the primary allocation area should be used to store data associated with data write requests. The controller determines whether the secondary allocation area should be used based on the contiguity score for the secondary allocation area and the contiguity score for the primary allocation area.

The controller may receive, from the host of the data storage system, requests to write data to a portion of a storage volume. The controller enqueues the requests to write data to a portion of the storage volume such that the requests to write data can be executed in batches. The controller enqueues the requests until such a time where the total data size of the enqueued data satisfies write size criteria. In some cases, write size criteria is a write block size that is a multiple of a data block size of the write requests. Once the total data size of the enqueued data satisfies the write size criteria, the controller writes the data to the physical storage mapped to the secondary allocation area.

To determine to use the secondary allocation area for storing data based on the contiguity score for the secondary allocation area and the contiguity score for the primary allocation area, the controller evaluates whether the contiguity score for the secondary allocation area meets or exceeds the contiguity score for the primary allocation area. Where the contiguity score for the secondary allocation area meets or exceeds the contiguity score for the primary allocation area, the secondary allocation area is used to store data.

In some cases, the contiguity score for the primary allocation area is determined based on measuring the contiguity of the underlying physical blocks of physical storage that are mapped to the primary allocation area. In such cases, the contiguity score for the secondary allocation area is determined based on measuring the contiguity of the underlying physical blocks of physical storage that are mapped to the secondary allocation area, which are a subset of the physical blocks of physical storage mapped to the primary allocation area.

In some cases, the primary allocation area is a logical block representation of the physical blocks mapped to the primary allocation area. In such cases, the logical block representation may be a range of logical block numbers. Further, in such cases, the secondary allocation area is a logical block representation of the physical blocks mapped to the secondary allocation area. Here, the logical block representation associated with the secondary allocation area may be a smaller range of logical block numbers within the range of logical block numbers corresponding to the primary allocation area.

The logical block numbers corresponding to the primary allocation area and the secondary allocation area may be physical volume block numbers (PVBN) that are mapped to file block numbers (FBN) of the storage volume and to disk block numbers (DBN) of physical blocks of the physical storage. In some scenarios, FBNs map directly to PVBNs, while in other scenarios, the mapping between FBNs and PVBNs may be indirect and involve a number of intermediary translations, conversions, mappings, and the like. An example of such an indirect relation is given where FBNs map to virtual volume block numbers (VVBN) and VVBNs map to PVBNs. In such an example, VVBNs are an intermediary abstraction layer between the FBNs and the PVBNs.

The controller of the data storage system may determine a contiguity score for a different secondary allocation area from within the primary allocation area. The contiguity score for the different secondary allocation area is determined based on the contiguity of physical storage mapped to the different secondary allocation area. The controller determines, based on the contiguity score for the different secondary allocation area and the contiguity score for the primary allocation area, if the different secondary allocation area should be skipped.

Various embodiments of the present technology provide for a wide range of technical effects, advantages, and/or improvements to computing systems and components. For example, various embodiments may include one or more of the following technical effects, advantages, and/or improvements: 1) non-routine and unconventional evaluation and selection of allocation areas, allowing for improved and computationally efficient allocation of data storage; and 2) non-routine and unconventional use of contiguity analysis, allowing for improved data storage system processes and more efficient use of data storage resources.

Referring to the first technical effect listed above, subdividing an allocation area (i.e., a primary allocation area) into portions (i.e., multiple secondary allocation areas) provides a greater level of information about the physical contiguity of the allocation area at a more granular level. The additional contiguity information allows for improved selection of allocation areas and subdivided portions within the allocations area, resulting in increased likelihood that data is written to contiguous blocks of physical storage when compared with existing systems and techniques. Beneficially, this enhanced ability to evaluate allocation area contiguity is computationally efficient compared with the computing resources required in existing systems and techniques. While existing strategies evaluate the contiguity for each allocation area and compare all of the contiguities, the technology disclosed herein has the potential to significantly reduce the resources used in data storage system write allocation processes. For example, determining and comparing the contiguity of a single primary allocation area to a single secondary allocation area and deciding to use that secondary allocation area to store data represents a significant reduction of resource use over the resources required to evaluate each of the primary allocation areas of the one or more drives in a data storage system and then to compare each of the contiguities to each of the other contiguities.

Referring to the second technical effect listed above, writing batches of enqueued write requests to storage based on the enhanced contiguity evaluation provides a greater ability to utilize drive resources. Not that in some cases, the one or more drives of the data storage system are solid state drives (SSD). SSDs increasingly use larger and larger write block sizes (e.g., 16 k write block size), while data storage systems associated with those SSDs are commonly designed for smaller unchanging write block sizes (e.g., a 4 k write block size). For example, while a data storage system may provide a data storage system controller with a 4 k write block, the one or more drives that the controller would write the 4 k write block to may still prefer 16 k write blocks. In such a scenario, the one or more drives are likely to write the 4 k write block as a 16 k write block, meaning that an additional 12 k of storage space will be written to despite not being used or the data contained therein remaining unchanged. Because SSDs have a limited number of write cycles, the unnecessary writing to 12 k of storage space represents an inefficient use of the limited resources SSDs provide. To continue the foregoing example with regard to the technology disclosed herein, the controller of the data storage system receives requests to write data in 4 k blocks, while the one or more drives are SSDs with 16 k preferred write block sizes. Here, the controller receives and enqueues the requests to write 4 k data blocks until such a time when the total size of the enqueued data equals the size of the SSDs' preferred write block sizes, here being 16 k. The controller enqueues four requests to write 4 k blocks of data, the total size of which now equals the 16 k preferred write block size. The controller then writes the entire 16 k batch to the one or more drives, both reducing the number of requests the controller must make to execute the requests to write data, and also minimizing unnecessary writing and rewriting of data storage space that is either not used or contains data that is unchanged.

FIG. 1 illustrates data storage system 100 in accordance with an implementation. Data storage system 100 includes host 101, controller 103, and drives 110. Controller 103 further includes allocation area 130, allocation area 140, allocation area 150, and allocation area 160. Drives 110 further includes drive 111, drive 112, drive 113, drive 114, drive 115, drive 116, drive 117, drive 118, drive 119, and drive 120.

Data storage system 100 could be deployed in a variety of data storage applications across a number of industries, examples of which include cloud computing services, data centers, enterprise management systems, big data analysis systems, or in any other application where data storage services are used.

Figure 10:
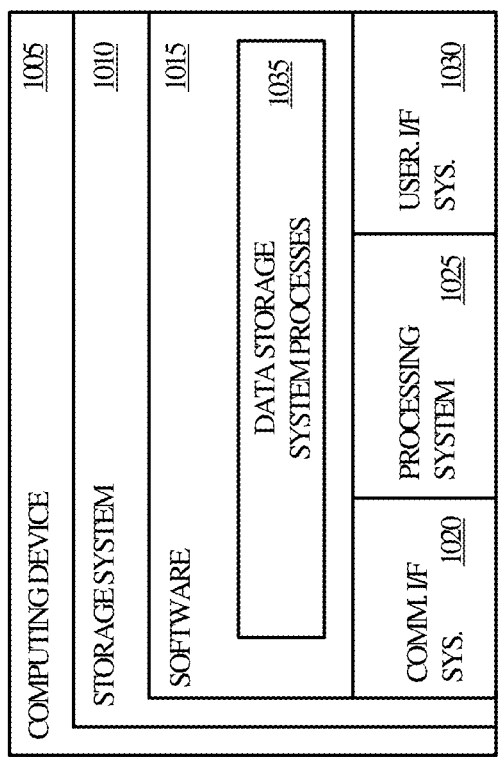
FIG. 10 illustrates another contiguity scoring method in accordance with an implementation.

Host 101 is generally representative of a host device on which data storage system 100 can be implemented. Host 101 may be a local or distributed computing device, of which computing device 1005 of FIG. 10 is generally representative. Host 101 may also be a virtualized computing device. Host 101 is a single instance of a host device as illustrated in FIG. 1, though data storage system 100 may include any number of instances of host devices. Host 101 is generally responsible for receiving I/O requests and to provide the I/O requests to controller 103. Host 101 may receive the I/O requests from an application executed within host 101 or may receive the I/O requests from an external source. Each I/O request may be associated with a particular workload, application, or the like. Host 101 is communicatively coupled with controller 103. The coupling between host 101 and controller 103 may be a local area network, a wireless network connection, or other forms of communication sufficient to communicatively couple the elements of data storage system 100. In some scenarios, host 101 is configured to receive a response from controller 103 having an acknowledgement, requested data, a combination thereof, or some other response content.

In some embodiments, host 101 is configured to receive I/O requests that reference logical ranges of storage in which data may be retrieved from or stored in. In some embodiments, host 101 receives I/O requests that reference logical file blocks and converts the I/O requests to ones that reference logical volume blocks.

Controller 103 is generally representative of hardware, software, or firmware for managing the flow of data between storage devices (e.g., hard drives) and a computing device or central processing device (e.g., host 101 of FIG. 1 or computing device 1005 of FIG. 10). Controller 103 may be hardware independent of host 101, may be integrated into host 101, or may be implemented via virtual computing resources. Controller 103 is configured to receive I/O requests from host 101 and to transmit the I/O requests to drives 110 to facilitate execution. To facilitate execution of I/O requests, controller 103 is configured to evaluate allocation areas of drives 110 and to select an allocation area. Where the I/O requests are requests to write data, controller 103 is responsible for selecting the allocation area that the data is to be written to. To optimize data write operations and subsequent data read operations, controller 103 seeks to maximize the frequency with which data is written to physically contiguous locations in physical storage. Because of the proximity of data written to contiguous locations in physical storage, both writing the data and reading the data can be performed with improved efficiency when compared to data written to discontiguous locations in physical storage. This is particularly true where data storage system 100 is a distributed system using multiple physical distinct drives to support data storage services.

Controller 103 maintains information about allocation area 130, allocation area 140, allocation area 150, and allocation area 160. Each of allocation area 130, allocation area 140, allocation area 150, and allocation area 160 are generally representative of allocation areas of drives 110. An allocation area of drives 110 is a region of drives 110 allocated for storing data. An allocation area may correspond to data of a specific application, workload, client, or the like. Allocation area 130 is generally representative of a primary allocation area. A primary allocation area is an allocation area that has within it a number of smaller allocation areas. The smaller allocation areas within the primary allocation area are referred to as secondary allocation areas. Allocation area 140, allocation area 150, and allocation area 160 are each generally representative of a secondary allocation area that together make up allocation area 130. Allocation area 130 may be divided into secondary allocation areas in a number of ways that may result in varying numbers of secondary allocation areas of varying sizes.

The allocation areas of drives 110 are logical block representations of the physical blocks mapped to each of the allocation areas. The logical block representation may be a range of logical block numbers. Further, the logical block representations associated with secondary allocation areas are smaller ranges of logical block numbers within the range of logical block numbers corresponding to the primary allocation area that the secondary allocation area is within. In some cases, the allocation areas of drives 110 are logical block representations of the physical blocks mapped to each respective allocation area. In such cases, the logical block representation may be a range of logical block numbers. The logical block representations associated with secondary allocation areas may be smaller ranges of logical block numbers within the range of logical block numbers corresponding to the relevant primary allocation area.

In order to select an allocation area of drives 110 to facilitate I/O requests, controller 103 evaluates allocation area 130, allocation area 140, allocation area 150, and allocation area 160. By evaluating allocation area 130, allocation area 140, allocation area 150, and allocation area 160, controller 103 is capable of evaluating the contiguity of the physical blocks of storage of drives 110. To evaluate contiguity, controller 103 examines the physical storage blocks of drives 110. Contiguous runs of physical storage blocks are identified, and corresponding allocation areas are recorded. By evaluating the full range of physical storage blocks of drives 110 a single time, controller 103 has already acquired the information necessary to determine the contiguity for allocation area 130 and each of allocation area 140, allocation area 150, and allocation area 160. Controller 103 can then compare allocation area 130 to allocation area 140. Where allocation area 140 has a contiguity that meets or exceeds the contiguity of allocation area 130, allocation area is utilized for the data associated with the I/O requests. Where the contiguity of allocation area 140 does not meet or exceed the contiguity of allocation area 130, controller 103 proceeds to a comparison of allocation area 130 and allocation area 150. Controller 103 may evaluate drives 110 in response to receiving I/O requests or may also continuously evaluate drives 110 in the background before or while I/O requests are received. Examples of methods for determining allocation area contiguity scores and for selecting allocation areas are given in the steps of FIG. 9 and FIG. 10.

Drives 110 is generally representative of one or more storage devices used in data storage system 100 to facilitate data storage services. The one or more storage devices of drives 110 are represented in FIG. 1 by drive 111, drive 112, drive 113, drive 114, drive 115, drive 116, drive 117, drive 118, drive 119, and drive 120. Each of drive 111, drive 112, drive 113, drive 114, drive 115, drive 116, drive 117, drive 118, drive 119, and drive 120 may be a distinct physical device or may otherwise be abstractions of virtualized computing resources. Drives 110 and the elements therein are leveraged to store data to and read data from in accordance with the I/O requests received by host 101 and transmitted to controller 103. Drives 110 may include any number of primary allocation areas, which may be further divided into any number of secondary allocation areas.

In an example operation, host 101 receives an I/O request from a client workload. Here, the client workload has a relatively high priority, indicating a need for relatively high-performance data write and data read operations. Here, the I/O request received is a request to write data. The write request is received at host 101, which transmits the write request to controller 103. Controller 103 has been continuously evaluating drives 110 to score the contiguity of allocation area 130, allocation area 140, allocation area 150, and allocation area 160. In the ongoing example, controller 130 has determined during a comparison of allocation area 130 and allocation area 140 that allocation area 140 has a contiguity that meets or exceeds the contiguity of allocation area 130. In response, controller 103 selects allocation area 140 for use, and transmits the write request to the drive of drives 110 that corresponds with allocation area 140.

Figure 2:
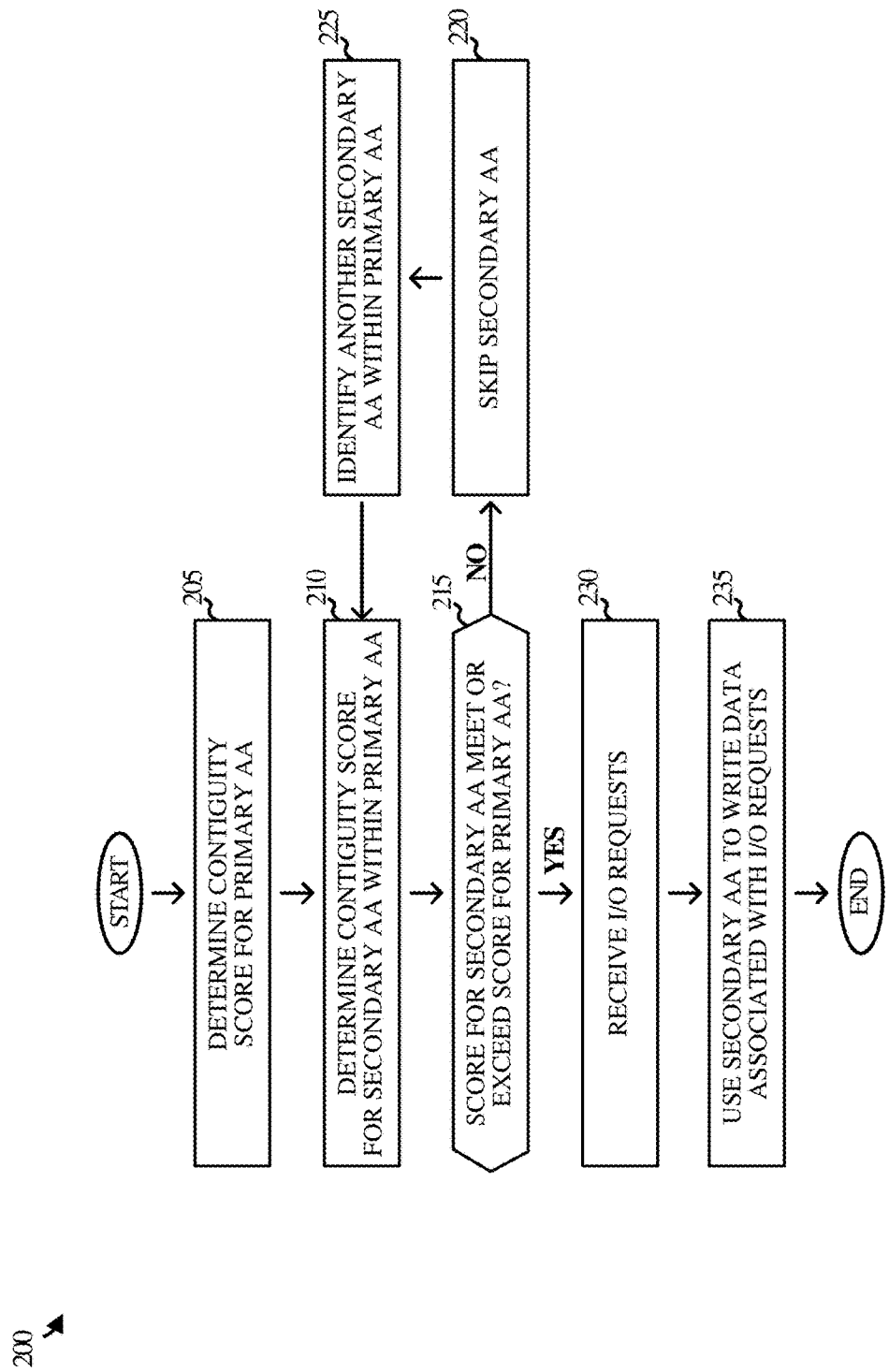
FIG. 2 illustrates a method of operating a data storage system in accordance with an implementation.

FIG. 2 illustrates method 200 of operating a data storage system in accordance with an implementation. Method 200 may be implemented in program instructions in the context of the software and/or firmware elements of host 101, controller 103, or a combination thereof. The program instructions, when executed by one or more processing devices of one or more computing systems (e.g., computing device 1001 in FIG. 10), direct the one or more computing systems to operate as follows, referring parenthetically to the steps in FIG. 2, and in the singular to a computing device for the sake of clarity.

To begin, a controller (e.g., controller 103 of FIG. 1) of a data storage system (e.g., data storage system 100 of FIG. 1) determines a contiguity score for a primary allocation area (e.g., allocation area 130) (step 205). The contiguity score for the primary allocation area is determined by evaluating the physical storage that corresponds to the logical storage of the primary allocation area. A contiguity score is then determined for a secondary allocation area within the primary allocation area (step 210). The contiguity score for the primary allocation area is then compared to the contiguity score for the secondary allocation area. Where the contiguity score for the secondary allocation area meets or exceeds the contiguity score for the primary allocation area, the secondary allocation area is used (step 215). In such a scenario, the controller then receives I/O requests from a host of the data storage system (e.g., host 101) (step 230). The secondary allocation area is then used to write data associated with the I/O requests (step 235).

In some scenarios, the contiguity score for the secondary allocation area does not meet or exceed the contiguity score for the primary allocation area (step 215). In those cases, the secondary allocation area is skipped (step 220), meaning the secondary allocation area will not be used to write the data associated with the I/O requests. Another secondary allocation area within the primary allocation area is then identified (step 225). A contiguity score is determined for the newly identified secondary allocation area, and the method continues (step 210).

Figure 3:
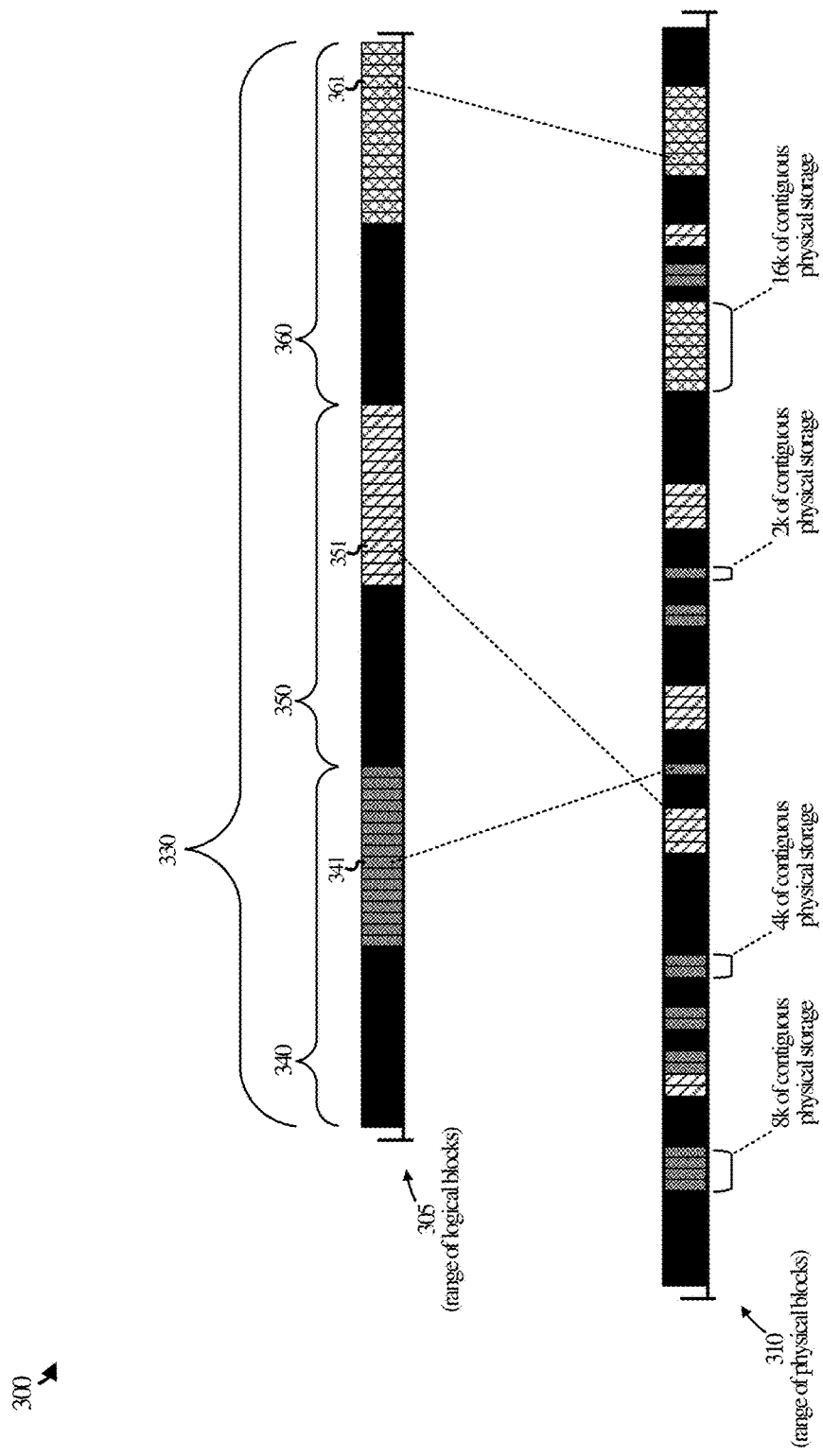
FIG. 3 illustrates an operational scenario in accordance with an implementation.

FIG. 3 illustrates operational scenario 300 in accordance with an implementation. Operational scenario 300 includes range of logical blocks 305, range of physical blocks 310, allocation area 330, allocation area 340, allocation area 350, allocation area 360, logical block 341, logical block 351, and logical block 361. Operational scenario 300 is generally representative of a visual depiction of a primary allocation area divided into multiple secondary allocation areas. Operational scenario 300 depicts storage with regard to logical blocks of storage and physical blocks of storage.

Allocation area 330 is generally representative of a primary allocation area, of which allocation area 130 of FIG. 1 is an example. Allocation area 340, allocation area 350, and allocation area 360 are each generally representative of a secondary allocation area, of which allocation area 140 of FIG. 1, allocation area 150 of FIG. 1, and allocation area 160 of FIG. 1 are each respectively examples. Allocation area 330, allocation area 340, allocation area 350, and allocation area 360 are each illustrated with respect to range of logical blocks 305. Each of allocation area 340, allocation area 350, and allocation area 360 logical blocks that are each a subset of the logical blocks that make up allocation area 330. Allocation area 340 includes a number of logical storage blocks of range of logical blocks 305. Within allocation area 340, storage blocks that are not available for use are shaded black, while storage blocks that are available for use, including logical block 341, are represented by a dark shade of crosshatching. Allocation area 350 includes a number of logical storage blocks of range of logical blocks 305. Within allocation area 350, storage blocks that are not available for use are shaded black, while storage blocks that are available for use, including logical block 351, are represented by a light shade of crosshatching. Allocation area 360 includes a number of logical storage blocks of range of logical blocks 305. Within allocation area 360, storage blocks that are not available for use are shaded black, while storage blocks that are available for use, including logical block 361, are represented by a medium darkness shade of crosshatching.

Range of logical blocks 305 are a logical representation of the storage of drives of the data storage system (e.g., drives 110), while range of physical blocks 310 represent the actual placement and fragmentation of physical storage blocks in drives of the data storage system (e.g., drives 110). As illustrated in FIG. 3, physical storage blocks become fragmented during operation. Because of the flexible nature of logical abstraction of data storage, the storage illustrated in range of logical blocks 305 is contiguous. The physical storage that corresponds to the logical storage in allocation area 330, allocation area 340, allocation area 350, and allocation area 360 becomes fragmented over time, however, as certain storage blocks are freed while others are maintained.

Range of physical blocks 310 has scattered runs of available storage blocks among sections of unavailable storage. As illustrated in range of physical blocks 310, each run of available storage blocks may be a variety of sizes. Example data block sizes of contiguous physical storage in FIG. 3 include 2 k of contiguous physical storage, 4 k of contiguous physical storage, 8 k of contiguous physical storage, and 16 k of contiguous physical storage, though other lengths of contiguous physical storage may be identified in other embodiments. Further, each available block of physical storage corresponds to one of allocation area 340, allocation area 350, or allocation area 360. The relationships between range of logical blocks 305 and range of physical blocks 310 are denoted by the cross-hatching of the storage blocks. Storage blocks having the same cross hatching correspond to the same allocation area. Additionally, the fragmented nature of range of physical blocks 310 is demonstrated by the placement of logical block 341, logical block 351, and logical block 361. Notably, logical block 341, while part of a continuous run of logical blocks in allocation area 340, is isolated from other blocks of allocation area 340 with respect to range of physical blocks 310. In contrast, logical block 351 is part of an 8 k run of contiguous blocks of physical storage, while logical block 361 is part of a 16 k run of contiguous blocks of physical storage. The storage blocks of range of physical blocks 310 may become fragmented as a result of wear leveling, garbage collection, data compression, data deduplication, or any other process that results in the fragmentation of available storage space.

As illustrated in FIG. 3, each of allocation area 340, allocation area 350, and allocation area 360 have sixteen available blocks of storage capacity, which each represent 2 k of contiguous storage capacity. In other embodiments, the amount of storage capacity associated with a storage block may differ. Range of logical blocks 305 shows each respective storage capacity as contiguous runs of logical blocks. Range of physical blocks 310, however, reveals the true discontiguous extent of the physical storage underlying each of allocation area 340, allocation area 350, and allocation area 360. Allocation area 340 has two 2 k runs of contiguous physical storage, five 4 k runs of contiguous physical storage, one 8 k run of contiguous physical storage, and zero 16 k runs of contiguous physical storage. Allocation area 350 has zero 2 k runs of contiguous physical storage, two 4 k runs of contiguous physical storage, three 8 k runs of contiguous physical storage, and zero 16 k runs of contiguous physical storage. Allocation area 360 has zero 2 k runs of contiguous physical storage, zero 4 k runs of contiguous physical storage, zero 8 k run of contiguous physical storage, and two 16 k runs of contiguous physical storage. The number and magnitude of various sizes of contiguous physical storage are used to calculate the contiguity score for each corresponding allocation area. A number of different strategies may be used to calculate contiguity scores and in some cases, to compare or rank the contiguity for a number of allocation areas.

Figure 4:
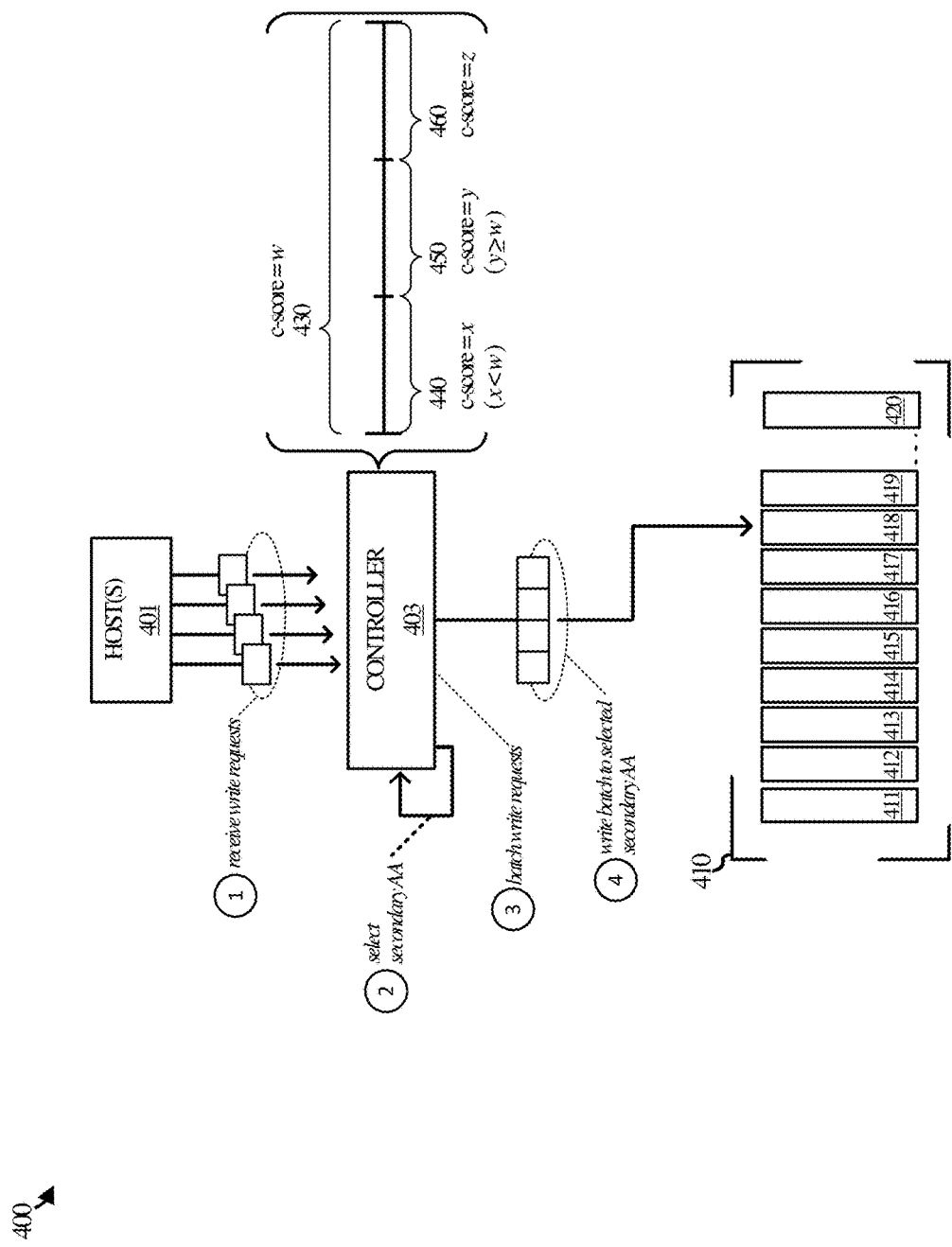
FIG. 4 illustrates another operational scenario in accordance with an implementation.

FIG. 4 illustrates another operational scenario, hereinafter represented by scenario 400, in accordance with an implementation. Scenario 400 may be considered with regard to the elements and steps associated with data storage system 100 of FIG. 1. Scenario 400 includes host 401, controller 403, drives 410, Controller 403 further includes allocation area 430, allocation area 440, allocation area 450, and allocation area 460. Drives 410 further includes drive 411, drive 412, drive 413, drive 414, drive 415, drive 416, drive 417, drive 418, drive 419, and drive 420.

Host 401 is generally representative of a host device on which scenario 400 may be carried out, and example of which is given by host 101 of FIG. 1. Controller 403 is generally representative of hardware, software, or firmware for managing the flow of data between storage devices and a computing device or central processing device, an example of which is given by controller 103 of FIG. 1. Allocation area 430 is generally representative of a primary allocation area, an example of which is given by allocation area 130 of FIG. 1. Allocation area 440, allocation area 450, and allocation area 460 are each generally representative of a secondary allocation area, examples of which is given by allocation area 140, allocation area 150, and allocation area 160 of FIG. 1. Drives 410 is generally representative of one or more storage devices used to facilitate data storage services. The one or more storage devices of drives 410 are represented by drive 411, drive 412, drive 413, drive 414, drive 415, drive 416, drive 417, drive 418, drive 419, and drive 420. Drives 410 is substantially the same as drives 110 of FIG. 1.

Scenario 400 illustrates a background process in which controller 403 evaluates allocation area 430, allocation area 440, allocation area 450, and allocation area 460. Scenario 400 further illustrates an operational process in which controller 403 receives write requests and allocates storage of drives 410 to facilitate the write requests. Scenario 400 includes a batching process carried out by controller 403.

As a background operation, controller 403 continuously evaluates allocation areas to identify runs of contiguous blocks of physical storage. In some cases, controller 403 need only identify runs of contiguous blocks of physical storage in allocation area 430 once. The information acquired can be used to determine the contiguity for allocation area 430, and subsequently to determine the contiguity for allocation area 440, allocation area 450, and allocation area 560 without any further evaluation of drives 410. As illustrated here, controller 403 acquires the contiguity information and calculates contiguity scores for each of allocation area 430, allocation area 440, allocation area 450, and allocation area 460. In some embodiments, the calculation of a contiguity score for allocation area 430 provides sufficient information to determine the contiguity scores for allocation area 440, allocation area 450, and allocation area 460. In some embodiments, the contiguity score for allocation area 430 and allocation area 440 are calculated first and compared. In such embodiments, the contiguity score for allocation area 450 is only calculated where the continuity score of allocation area 440 does not meet or exceed the contiguity score of allocation area 430 and the contiguity score for allocation area 460 is only calculated where neither allocation area 440 or allocation area 450 meet or exceed the contiguity score of allocation area 430.

As illustrated in FIG. 4, controller 403 receives a number of write requests from host 401 and transmits batches of write requests to drives 410. Notably, many data storage systems are configured to write blocks to storage of a particular predetermined size. For example, the Write Anywhere File Layout (WAFL®), a component of the DATA ONTAP® data storage system by NETAPP®, has a data write block size of 4 k. An increasing number of SSD storage devices, however, favor 16 k data write blocks. Further, SSDs typically have fixed write blocks sizes, and the entire block is rewritten regardless of how little information in the block has been updated. To minimize unnecessary erasing and rewriting of unchanged information, controller 403 batches write requests received from host 401 and transmits a single batch write request to drives 410. The batch of write request can be sent to drives 410 once the size of the batch equals a predetermined threshold size. In some cases, the predetermined threshold for the batch size is equal to the SSD write block size. In some cases, the SSD write block size is a multiple of the write block size of the data storage system write.

Because the lifespans of SSDs have a limited number of write cycles, efficient utilization of the full SSD write block increases the usable lifespan of an SSD compared to operation that does not utilize the full SSD write block and experiences write amplification.

In operation, scenario 400 begins with host 401 sending write requests to controller 403. In the ongoing example, host 401 utilizes a 4 k write block, while drives 410 utilize 16 k write blocks. At step 1, controller 403 receives the 4 k write requests from host 401. At step 2, controller 403 selects a secondary allocation area based on continuous background evaluation of allocation area 440, allocation area 450, and allocation area 460. First, controller 403 determines contiguity scores for allocation area 430 and allocation 440. Based on a comparison of the contiguity scores, controller 403 determines whether to use allocation area 440 for I/O requests. As illustrated here, allocation area 430 has a contiguity score of w, while allocation area 440 has a contiguity score of x. As further illustrated, the contiguity score value of x is less than the contiguity score value of w'. Because the contiguity score for allocation area 440 does not meet or exceed the contiguity score of allocation area 430, allocation area 440 is skipped, and allocation area 450 is evaluated. As illustrated, the contiguity score value of y meets or exceeds the contiguity score value of w'. As a result, allocation area 450 is selected by controller 403.

At step 3, controller 403 batches the 4 k write requests until the batch equals the size of the SSD write block. Here, the SSD write block is 16 k, meaning that once controller 403 batches four of the 4 k write requests, the batch is written to drives 410. At step 4, the batch is written to the selected secondary allocation area of drives 410. Here drive 418 corresponds to allocation area 450. As such, the 16 k batch of write requests are written to drive 418.

Figure 5:
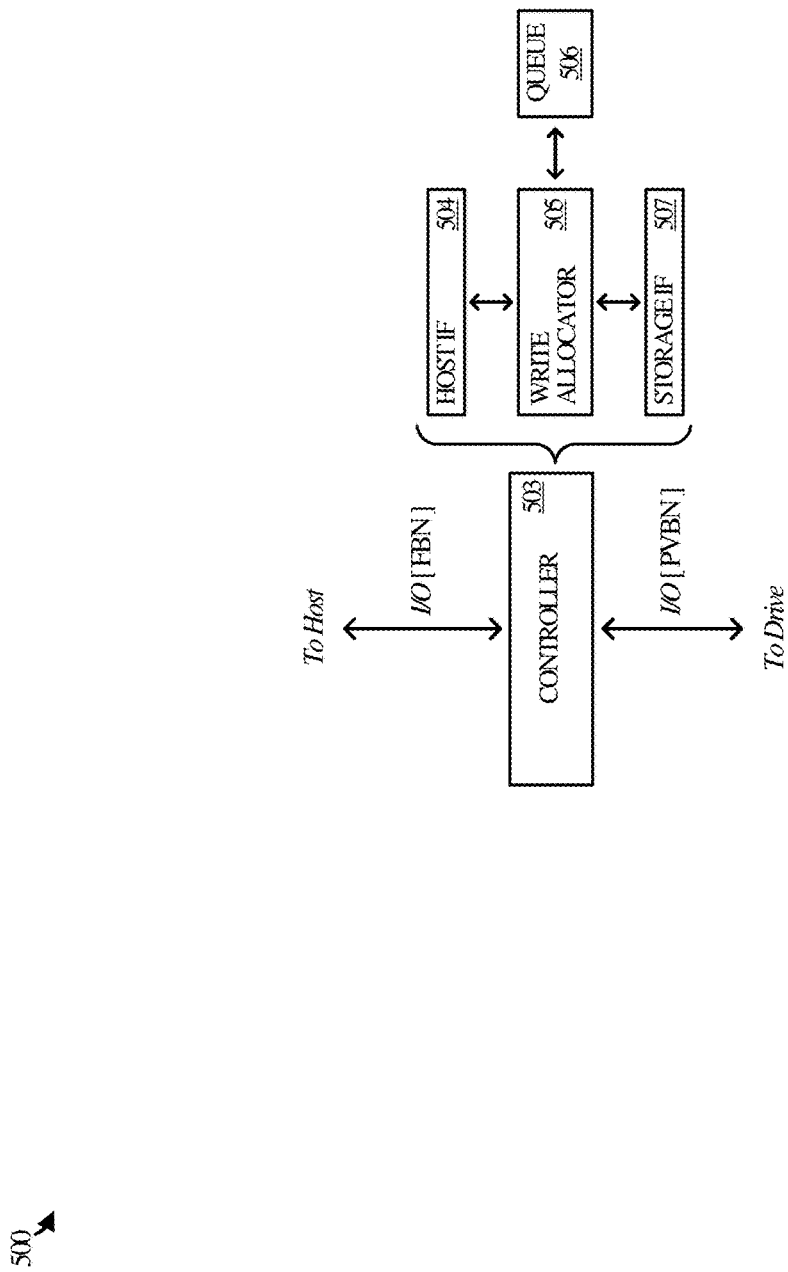
FIG. 5 illustrates a controller of a data storage system in accordance with an implementation.

FIG. 5 illustrates portion 500 of a data storage system in accordance with an implementation. Portion 500 includes controller 503, host interface 504, write allocator 505, queue 506, and storage interface 529. Controller 503 is generally representative of hardware, software, or firmware for managing the flow of data between storage devices and a computing device or central processing device, an example of which is given by controller 103 of FIG. 1.

Host interface 504 is generally representative of hardware, software, or firmware for managing communication between controller 503 and a host, such as host 401 of FIG. 4. Write allocator 505 is representative of hardware, software, or firmware for evaluating and selecting allocation areas of drives such as drive 410 of FIG. 4. Write allocator 505 is configured to perform contiguity evaluations of allocation areas and to calculate contiguity scores for each allocation area based on the evaluations. I/O requests are then transmitted to allocation areas of the drives in accordance with the contiguity scores. Queue 506 is generally representative of a data storage structure for holding a batch of write requests in preparation for writing the batch of write requests to drives. Each write request can be stored in queue 506 until the enqueued batch reaches the size of the predetermined threshold. Storage interface 507 is generally representative of hardware, software, or firmware for managing communication between controller 503 and drives, such as drives 410 of FIG. 4.

Figure 6:
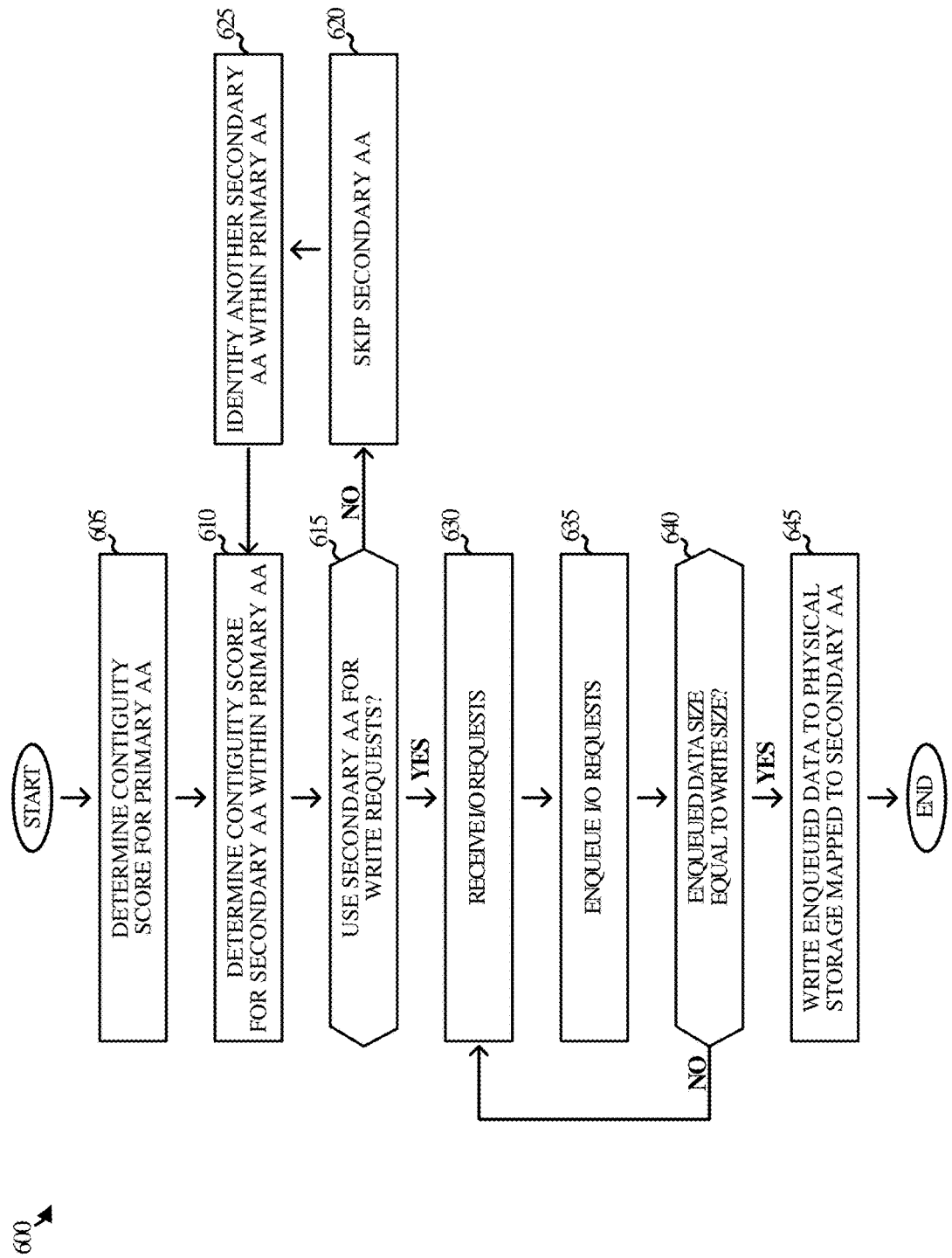
FIG. 6 illustrates another method of operating a data storage system in accordance with an implementation.

FIG. 6 illustrates another method of operating a data storage system, hereinafter represented by method 600, in accordance with an implementation. Method 600 may be implemented in program instructions in the context of the software and/or firmware elements of FIG. 1, FIG. 4, FIG. 5, or a combination thereof. The program instructions, when executed by one or more processing devices of one or more computing systems (e.g., computing device 1001 in FIG. 10), direct the one or more computing systems to operate as follows, referring parenthetically to the steps in FIG. 6, and in the singular to a computing device for the sake of clarity.

To begin, a controller (e.g., controller 503 of FIG. 5) of a data storage system (e.g., data storage system 100 of FIG. 1) determines a contiguity score for a primary allocation area (e.g., allocation area 130) (step 605). The contiguity score for the primary allocation area is determined by evaluating the physical storage that corresponds to the logical storage of the primary allocation area. A contiguity score is then determined for a secondary allocation area within the primary allocation area (step 610). The contiguity score for the primary allocation area is then compared to the contiguity score for the secondary allocation area. Where the contiguity score for the secondary allocation area meets or exceeds the contiguity score for the primary allocation area, the secondary allocation area is used (step 615). In such a scenario, the controller then receives I/O requests from a host of the data storage system (e.g., host 101) (step 630).

In some scenarios, the contiguity score for the secondary allocation area does not meet or exceed the contiguity score for the primary allocation area (step 615). In those cases, the secondary allocation area is skipped (step 620), meaning the secondary allocation area will not be used to write the data associated with the I/O requests. Another secondary allocation area within the primary allocation area is then identified (step 625). A contiguity score is determined for the newly identified secondary allocation area, and the method continues (step 610).

Each of the I/O requests are enqueued (step 635). I/O requests continue to be received until the size of the enqueued data equals a predetermined threshold (step 640), at which point the data of the enqueued write requests is written to the physical storage corresponding to the selected secondary allocation area.

Figure 7:
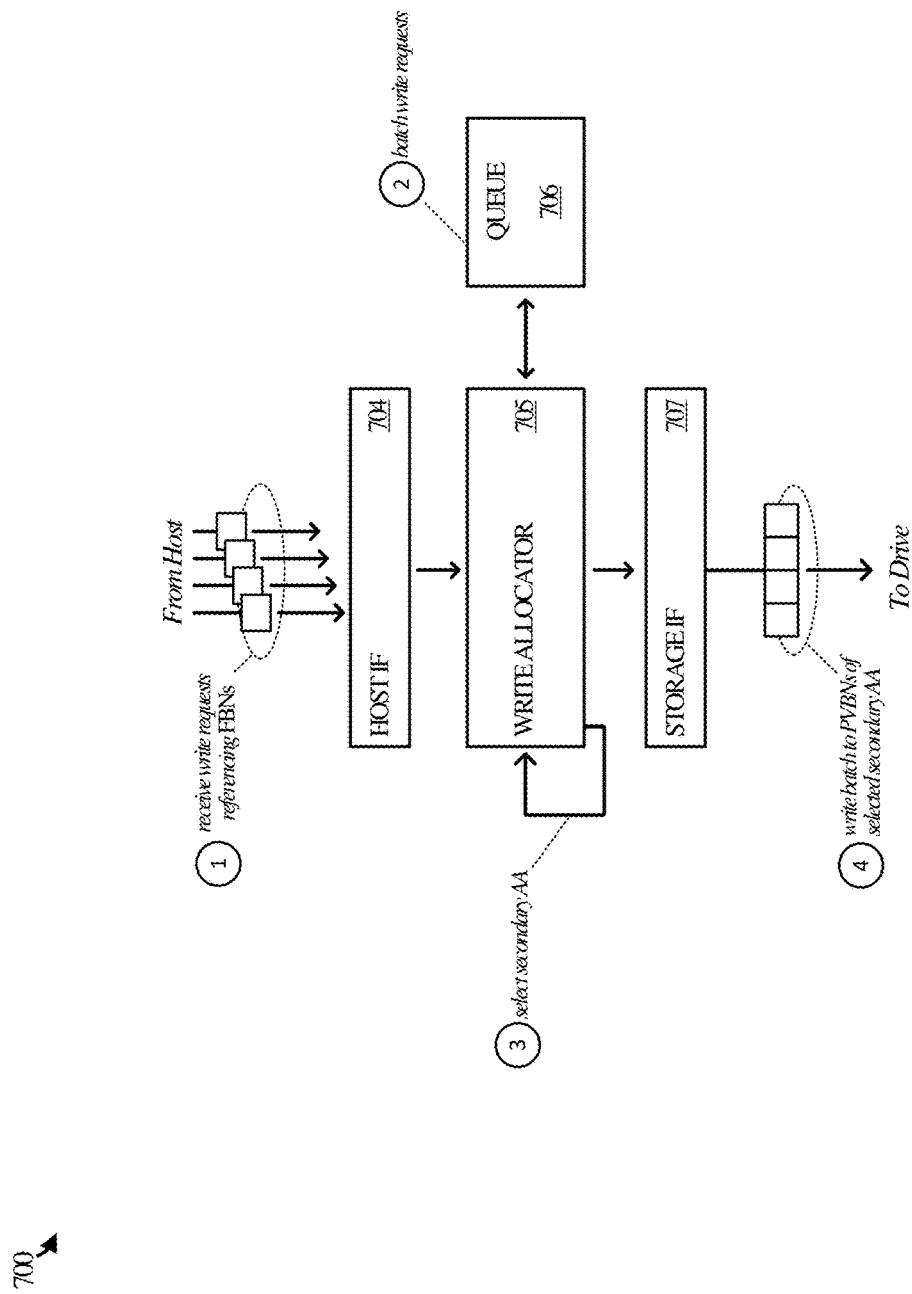
FIG. 7 illustrates another operational scenario in accordance with an implementation.

FIG. 7 illustrates another operational scenario, hereinafter represented by scenario 700, in accordance with an implementation. Scenario 700 includes host interface 710, write allocator 715, queue 720, and storage interface 725.

Host interface 704 is generally representative of hardware, software, or firmware for managing communication between controller 503 and a host, such as host 401 of FIG. 4. Write allocator 705 is representative of hardware, software, or firmware for evaluating and selecting allocation areas of drives such as drive 410 of FIG. 4. Write allocator 705 is configured to perform contiguity evaluations of allocation areas and to calculate contiguity scores for each allocation area based on the evaluations. I/O requests are then transmitted to allocation areas of the drives in accordance with the contiguity scores. Queue 706 is generally representative of a data storage structure for holding a batch of write requests in preparation for writing the batch of write requests to drives. Each write request can be stored in queue 706 until the enqueued batch reaches the size of the predetermined threshold. Storage interface 707 is generally representative of hardware, software, or firmware for managing communication between a controller, such as controller 503 of FIG. 5 and drives, such as drives 410 of FIG. 4.

In operation, host interface 704 receives write requests that reference logical block numbers at step 1. In some embodiments, host interface 704 receives write requests that reference file block numbers (FBN). Write allocator 705 converts the write requests referencing FBNs to write requests referencing a further layer of logical block numbers. In some embodiments, write allocator 705 converts write requests that reference FBNs to write requests that reference physical volume block numbers (PVBN). In some embodiments, the FBNs map directly to PVBNs, while in other scenarios, the mapping between FBNs and PVBNs may be indirect and involve any number of intermediary translations, conversions, mappings, and the like.

At step 2, the write requests are enqueued at queue 706. At step 3, a secondary allocation area is selected based on a contiguity evaluation performed by write allocator 705. At step 4, storage interface 707 writes the batch of write requests to the selected secondary allocation area to drives, such as drives 410 of FIG. 4. In some scenarios, the write requests written to the drives by storage interface 707 reference PVBNs.

Figure 8:
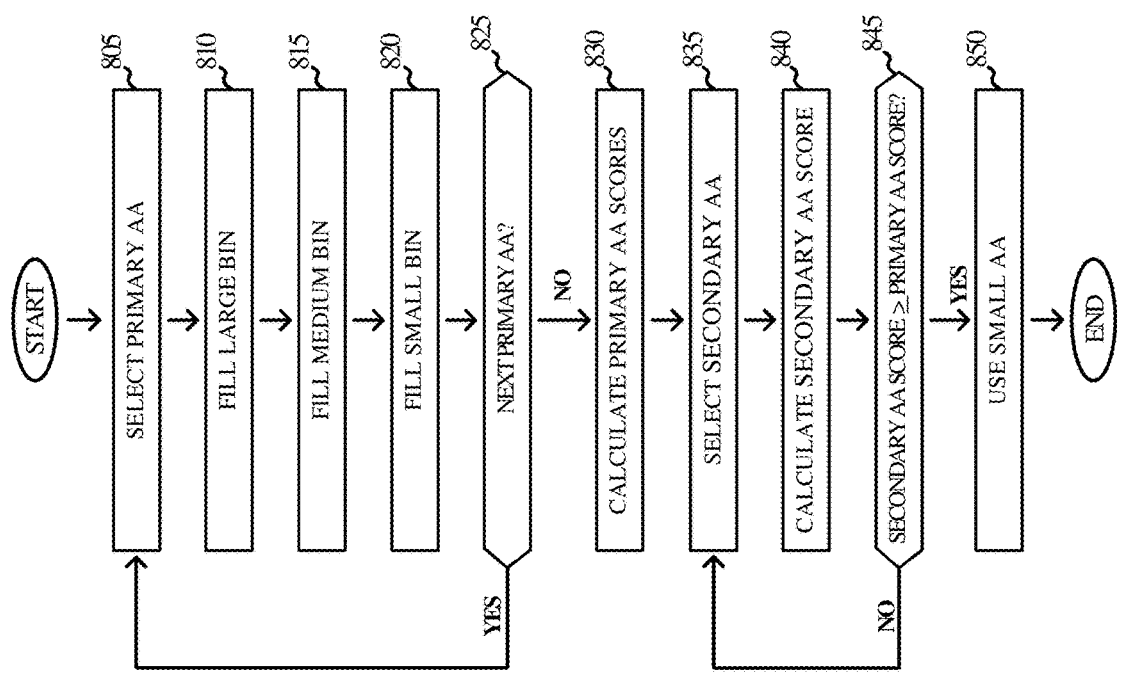
FIG. 8 illustrates computing device used in accordance with some implementations.

FIG. 8 illustrates a contiguity scoring method 800 in accordance with an implementation. Contiguity scoring method 800 may be implemented in program instructions in the context of the software and/or firmware elements of the preceding figures. The program instructions, when executed by one or more processing devices of one or more computing systems (e.g., computing device 1005), direct the one or more computing systems to operate as follows, referring parenthetically to the steps in FIG. 8, and in the singular to a computing device for the sake of clarity.

To begin, a primary allocation area is selected for evaluation (step 805). The primary allocation area is evaluated by identifying a number of various size runs of contiguous physical storage associated with the primary allocation area. Contiguous runs of physical storage of a large size are added to a large bin (step 810), contiguous runs of physical storage of a medium size are added to a medium bin (step 815), and contiguous runs of physical storage of a small size are added to a small bin (step 820). Where another primary allocation area is available for evaluation, the other primary allocation area is then evaluated. Where another primary allocation area is not available for evaluation, contiguity scores are calculated for the one or more primary allocation areas (step 830). A secondary allocation area is then selected (step 835). A contiguity score is calculated for the secondary allocation area (step 840). The contiguity score for the secondary allocation area and the contiguity score for the primary allocation area are then compared to each other (step 845). Where the contiguity score for the secondary allocation area meets or exceeds the contiguity score for the primary allocation area, the secondary allocation area is selected for use (step 850). Where the contiguity score for the secondary allocation area does not meet or exceed the contiguity score for the primary allocation area, the secondary allocation area is skipped, and another secondary allocation area is evaluated.

Figure 9:
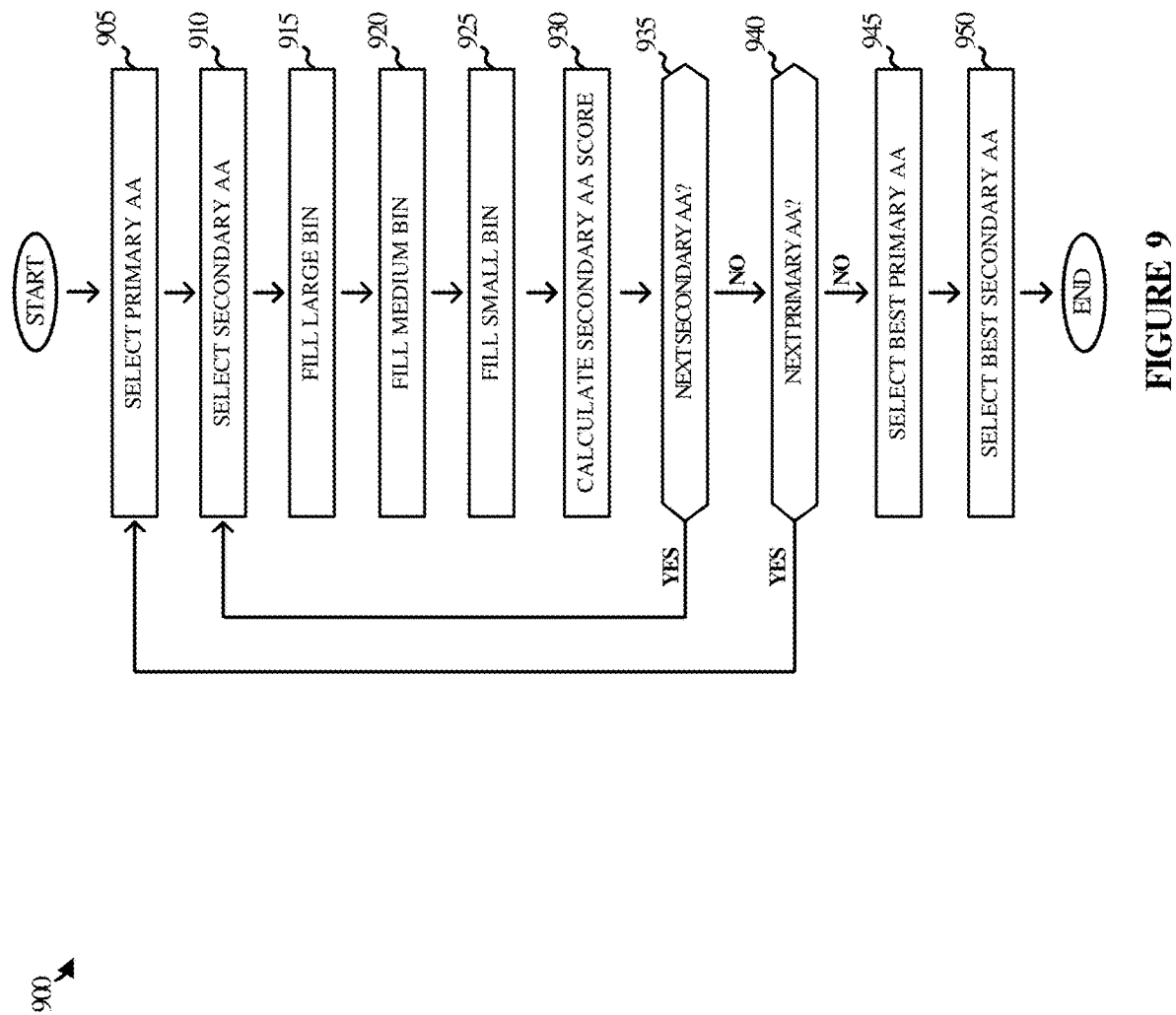
FIG. 9 illustrates a contiguity scoring method in accordance with an implementation.

FIG. 9 illustrates another contiguity scoring method, hereinafter represented by method 900, in accordance with an implementation. Method 900 may be implemented in program instructions in the context of the software and/or firmware elements of the preceding figures. The program instructions, when executed by one or more processing devices of one or more computing systems (e.g., computing device 1005), direct the one or more computing systems to operate as follows, referring parenthetically to the steps in FIG. 9, and in the singular to a computing device for the sake of clarity.

To begin, a primary allocation area is selected for evaluation (step 905). A secondary allocation area is then selected for evaluation (step 910). Both the primary allocation area and the secondary allocation area are evaluated by identifying a number of various size runs of contiguous physical storage associated with the primary allocation area and the secondary allocation area. Contiguous runs of physical storage of a large size are added to a large bin (step 915), contiguous runs of physical storage of a medium size are added to a medium bin (step 920), and contiguous runs of physical storage of a small size are added to a small bin (step 925). The contiguity scores are calculated for both the secondary allocation area and primary allocation area (step 930). Additional secondary allocation areas within the primary allocation area are evaluated (step 935). In some cases, another primary allocation area is evaluated (step 940). Where no further primary allocation area or secondary allocation area can be evaluated, the best primary allocation area is selected (step 945). The best secondary allocation area of the selected primary allocation area is then chosen for use (step 950).

FIG. 10 illustrates computing device used in accordance with some implementations. illustrates computing device 1005, which is representative of any system or collection of systems in which the various applications, processes, services, and scenarios disclosed herein may be implemented. Examples of computing device 1005 include, but are not limited to server computers, web servers, cloud computing platforms, and data center equipment, as well as any other type of physical or virtual server machine, container, and any variation or combination thereof. (In some examples, computing device 1005 may also be representative of desktop and laptop computers, tablet computers, and the like.)

Computing device 1005 may be implemented as a single apparatus, system, or device or may be implemented in a distributed manner as multiple apparatuses, systems, or devices. Computing device 1005 includes, but is not limited to, processing system 1025, storage system 1010, software 1015, communication interface system 1020, and user interface system 1030. Processing system 1025 is operatively coupled with storage system 1010, communication interface system 1020, and user interface system 1030.

Processing system 1025 loads and executes software 1015 from storage system 1010. Software 1015 includes and implements data storage system processes 1035, which is representative of the processes discussed with respect to the preceding Figures, such as method 200 of operating a data storage system. When executed by processing system 1025, software 1015 directs processing system 1025 to operate as described herein for at least the various processes, operational scenarios, and sequences discussed in the foregoing implementations. Computing device 1005 may optionally include additional devices, features, or functionality not discussed for purposes of brevity.

Referring still to FIG. 10, processing system 1025 may include a microprocessor and other circuitry that retrieves and executes software 1015 from storage system 1010. Processing system 1025 may be implemented within a single processing device but may also be distributed across multiple processing devices or sub-systems that cooperate in executing program instructions. Examples of processing system 1025 include general purpose central processing units, microcontroller units, graphical processing units, application specific processors, integrated circuits, application specific integrated circuits, and logic devices, as well as any other type of processing device, combinations, or variations thereof.

Storage system 1010 may comprise any computer readable storage media readable by processing system 1025 and capable of storing software 1015. Storage system 1010 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 1010 may be implemented as a single storage device but may also be implemented across multiple storage devices or sub-systems co-located or distributed relative to each other. Storage system 1010 may comprise additional elements, such as a controller, capable of communicating with processing system 1025 or possibly other systems.

Software 1015 (including data storage system processes 1035) may be implemented in program instructions and among other functions may, when executed by processing system 1025, direct processing system 1025 to operate as described with respect to the various operational scenarios, sequences, and processes illustrated herein. For example, software 1015 may include program instructions for implementing write allocation processes and procedures as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1015 may include additional processes, programs, or components, such as operating system software, virtualization software, or other application software. Software 1015 may also comprise firmware or some other form of machine-readable processing instructions executable by processing system 1025.

In general, software 1015, when loaded into processing system 1025 and executed, transforms a suitable apparatus, system, or device (of which computing device 1005 is representative) overall from a general-purpose computing system into a special-purpose computing system customized to support write allocation as described herein. Indeed, encoding software 1015 on storage system 1010 may transform the physical structure of storage system 1010. The specific transformation of the physical structure may depend on various factors in different implementations of this description. Examples of such factors may include, but are not limited to, the technology used to implement the storage media of storage system 1010 and whether the computer-storage media are characterized as primary or secondary storage, as well as other factors.

For example, if the computer readable storage media are implemented as semiconductor-based memory, software 1015 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1020 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 1005 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a data storage system, the method comprising:
  determining, by a controller in the data storage system, a contiguity score for a primary allocation area in the data storage system based on a contiguity of physical storage mapped to the primary allocation area;
  determining, by the controller, a contiguity score for a secondary allocation area within the primary allocation area based on a contiguity of physical storage mapped to the secondary allocation area;
  determining, by the controller, to use the secondary allocation area with respect to write requests to store data, based at least on the contiguity score determined for the secondary allocation area and the contiguity score determined for the primary allocation area; and instruct one or more storage devices to store the data in the physical storage mapped to the secondary allocation area.

2. The method of claim 1, further comprising, by the controller:
receiving the write requests from a host to write the data to a portion of a storage volume;
enqueuing each of the write requests until a total enqueued data size satisfies write size criteria, wherein the write size criteria comprise a write block size that is a multiple of a data block size of the write requests; and
in response to the total enqueued data size satisfying the write size criteria, writing the data via a single write request to the physical storage mapped to the secondary allocation area.

3. The method of claim 2, wherein determining, by the controller, to use the secondary allocation area to store the data based at least on the contiguity score determined for the secondary allocation area and the contiguity score determined for the primary allocation area comprises determining that the contiguity score for the secondary allocation area meets or exceeds the contiguity score for the primary allocation area.

4. The method of claim 3, wherein the contiguity score for the primary allocation area comprises a measure of contiguity of physical blocks of the physical storage mapped to the primary allocation area, and wherein the contiguity score for the secondary allocation area comprises a measure of contiguity of physical blocks of the physical storage mapped to the secondary allocation area.

5. The method of claim 4, wherein the primary allocation area comprises logical block representation of the physical blocks mapped to the primary allocation area, wherein the logical block representation of the primary allocation area comprises a range of logical blocks numbers.

6. The method of claim 5, wherein the secondary allocation area comprises logical block representation of the physical blocks mapped to the secondary allocation area, wherein the logical block representation comprises a smaller range of logical block numbers within the range of logical block numbers of the primary allocation area.

7. The method of claim 6, wherein the logical block numbers of the primary allocation area and the secondary allocation area comprise physical volume block numbers (PVBNs) mapped to file block numbers (FBNs) and to disk block numbers (DBNs) of the physical blocks of the physical storage.

8. The method of claim 1, further comprising:
determining, by the controller, a contiguity score for a different secondary allocation area within the primary allocation area based on a contiguity of physical storage mapped to the different secondary allocation area; and
determining, by the controller, to skip the different secondary allocation area with respect to the write requests, based at least on the contiguity score determined for the different secondary allocation area and the contiguity score determined for the primary allocation area.

9. A computing apparatus comprising:
one or more computer readable storage media;
one or more processors operatively coupled with the one or more computer readable storage media; and a data storage system comprising program instructions stored on the one or more computer readable storage media, wherein the program instructions, when executed by the one or more processors, direct the computing apparatus to at least:
determine a contiguity score for a primary allocation area in a data storage system based on a contiguity of physical storage mapped to the primary allocation area,
determine a contiguity score for a secondary allocation area within the primary allocation area based on a contiguity of physical storage mapped to the secondary allocation area,
determine to use the secondary allocation area with respect to write requests to store data, based at least on the contiguity score determined for the secondary allocation area and the contiguity score determined for the primary allocation area, and
instruct one or more storage devices to store the data in the physical storage mapped to the secondary allocation area.

10. The computing apparatus of claim 9, wherein the program instructions further comprise instructions that, when executed by the one or more processors, direct the computing apparatus to:
receive write requests from a host to write the data to a portion of a storage volume;
enqueue each of the write requests until a total enqueued data size satisfies write size criteria, wherein the write size criteria comprise a write block size that is a multiple of a data block size of the write requests; and
write, in response to the total enqueued data size satisfying the write size criteria, the data via a single write request to the physical storage mapped to the secondary allocation area.

11. The computing apparatus of claim 10, wherein the program instructions further comprise instructions that, when executed by the one or more processors, direct the computing apparatus to determine to use the secondary allocation area to store the data based at least on a determination that the contiguity score for the secondary allocation area meets or exceeds the contiguity score for the primary allocation area.

12. The computing apparatus of claim 11, wherein the contiguity score for the primary allocation area comprises a measure of contiguity of physical blocks of the physical storage mapped to the primary allocation area, and wherein the contiguity score for the secondary allocation area comprises a measure of contiguity of physical blocks of the physical storage mapped to the secondary allocation area.

13. The computing apparatus of claim 12, wherein the primary allocation area comprises logical block representation of the physical blocks mapped to the primary allocation area, wherein the logical block representation of the primary allocation area comprises a range of logical blocks numbers.

14. The computing apparatus of claim 13, wherein the secondary allocation area comprises logical block representation of the physical blocks mapped to the secondary allocation area, wherein the logical block representation comprises a smaller range of logical blocks numbers within the range of logical block numbers of the primary allocation area.

15. The computing apparatus of claim 14, wherein the logical block numbers of the primary allocation area and the secondary allocation area comprise physical volume block numbers (PVBNs) mapped to file block numbers (FBNs) and to disk block numbers (DBNs) of the physical blocks of the physical storage.

16. The computing apparatus of claim 9, wherein the program instructions further comprise instructions that, when executed by the one or more processors, direct the computing apparatus to:
    determine a contiguity score for a different secondary allocation area within the primary allocation area based on a contiguity of physical storage mapped to the different secondary allocation area; and
    determine to skip the different secondary allocation area with respect to write requests based at least on the contiguity score determined for the different secondary allocation area and the contiguity score determined for the primary allocation area.

17. A data storage system, comprising:
    a storage array comprising one or more storage devices to facilitate data storage services in the data storage system; and
    a controller in the data storage system, wherein the controller is configured to:
        determine a contiguity score for a primary allocation area in the storage array of the data storage system based on a contiguity of physical storage mapped to the primary allocation area,
        determine a contiguity score for a secondary allocation area within the primary allocation area based on a contiguity of physical storage mapped to the secondary allocation area,
        determine to use the secondary allocation area with respect to write requests to store data, based at least on the contiguity score determined for the secondary allocation area and the contiguity score determined for the primary allocation area, and
        instruct one or more storage devices to store the data in the physical storage mapped to the secondary allocation area.

18. The data storage system of claim 17, wherein the controller is further configured to:
    receive the write requests from the host, the write requests comprising a request to store data to a portion of a storage volume;
    enqueue each of the write requests until a total enqueued data size satisfies write size criteria, wherein the write size criteria comprise a write block size that is a multiple of a data block size of the write requests; and
    in response to the total enqueued data size satisfying the write size criteria, write the data via a single write request to the physical storage mapped to the secondary allocation area.

19. The data storage system of claim 18, wherein determining, by the controller, to use the secondary allocation area to store the data based at least on the contiguity score determined for the secondary allocation area and the contiguity score determined for the primary allocation area comprises determining that the contiguity score for the secondary allocation area meets or exceeds the contiguity score for the primary allocation area.

20. The data storage system of claim 19, wherein the contiguity score for the primary allocation area comprises a measure of contiguity of physical blocks of the physical storage mapped to the primary allocation area, and wherein the contiguity score for the secondary allocation area comprises a measure of contiguity of physical blocks of the physical storage mapped to the secondary allocation area.

* * * * *